United States Patent [19]

Rowe

[11] 4,375,524
[45] Mar. 1, 1983

[54] PROCESS CONTROL FOR FLASH CONCENTRATING SOLUTIONS CONTAINING POLYOLEFINS

[75] Inventor: Fred Rowe, Bartlesville, Okla.

[73] Assignee: Phillips Petroleum Company, Bartlesville, Okla.

[21] Appl. No.: 278,129

[22] Filed: Jun. 29, 1981

[51] Int. Cl.³ .............................................. C08J 3/00
[52] U.S. Cl. .................................. 523/303; 523/340; 528/501; 203/88
[58] Field of Search ................. 523/303, 340; 528/501

[56] References Cited

U.S. PATENT DOCUMENTS

| | | | |
|---|---|---|---|
| 2,908,734 | 10/1959 | Cottle | 260/683.15 |
| 2,931,433 | 4/1960 | Mertz | 159/47 |
| 2,982,763 | 5/1961 | McLeod | 260/94.9 |
| 3,036,057 | 5/1962 | Wallace | 260/94.9 |
| 3,470,070 | 9/1969 | Heckart | 203/88 |
| 4,233,267 | 11/1980 | Coker et al. | 202/205 |
| 4,271,060 | 6/1981 | Hubby | 526/335 |
| 4,278,506 | 7/1981 | Irvin | 528/501 |

*Primary Examiner*—John C. Bleutge
*Assistant Examiner*—Herbert J. Lilling

[57] ABSTRACT

Apparatus and methods are provided for controlling liquid levels in different vessels, and the blending of different materials in the separation and purification of polymeric materials in solution, such as polyethylene in cyclohexane.

6 Claims, 2 Drawing Figures

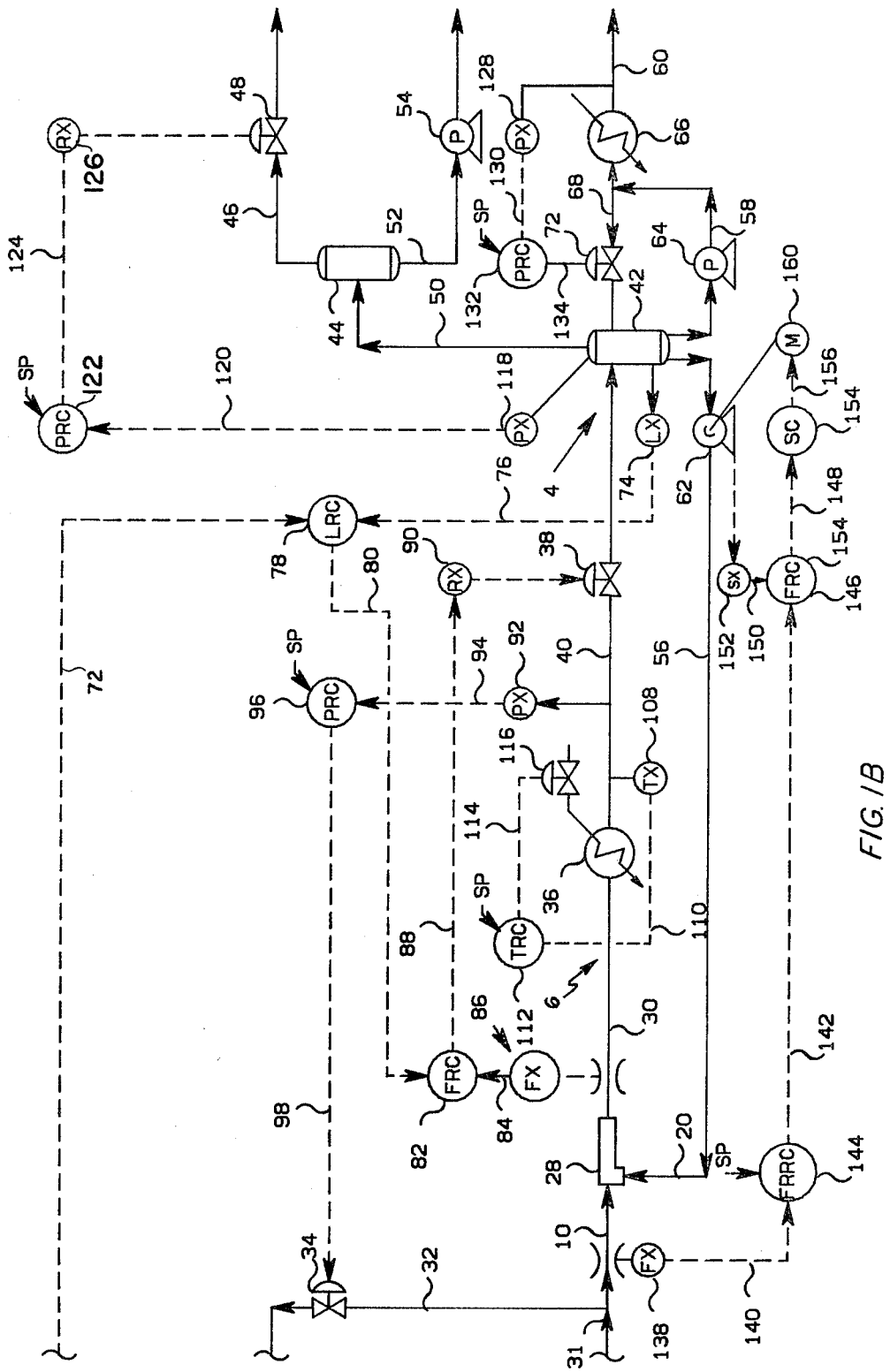
FIG. IB

PROCESS CONTROL FOR FLASH CONCENTRATING SOLUTIONS CONTAINING POLYOLEFINS

BACKGROUND OF THE INVENTION

The invention relates to apparatus and methods for controlling the concentrations of solute in hydrocarbon solvent.

In the several methods of polymerizing aliphatic olefins to solid polymers having high molecular weight, hydrocarbon solvents, such as cyclohexane, are frequently used to facilitate the polymerization reaction and also the subsequent transfer and separation steps. See for example, Hogan, et al., U.S. Pat. No. 2,825,721, Mar. 4, 1958. Several methods of polymer-solvent separation have been developed which include flashing some solvent, for example, such as in Seebold, U.S. Pat. Nos. 2,475,643, July 12, 1949, or Wallace, 3,036,057, May 22, 1962, to reach a desired polymer concentration in the solvent before separating the polymer in solvent by further steps. Frequently, the further steps include for example, further flashing and/or melt devolitilization, for example, utilizing apparatus such as marketed by Werner and Pfleiderer Corporation. Where melt devolitizers are utilized, control of polymer concentration, and flow rates in the melt devolitilizer feed are extremely important.

OBJECTS OF THE INVENTION

It is an object of this invention to simultaneously control liquid levels in two different vessels.

It is a further object of this invention to control the flow of polymer solutions to a flash concentrator vessel.

It is a still further object of the invention to control the recycle blending of bottoms material with fresh feed to a flash concentrator vessel.

It is a further object of this invention to control the temperature and pressure of a feed stream to be fed to a flash concentrator vessel.

STATEMENT OF THE INVENTION

According to one embodiment of the invention, a method comprises removing liquid from a first zone; pumping a first portion of the liquid to a second zone; recycling a second portion of the liquid to the first zone; sensing a first liquid level in the first zone and establishing a first signal representative of said first liquid level; sensing a second liquid level in the second zone and establishing a second signal representative of said second liquid level; establishing a third signal representative of a predetermined relationship between the first signal and the second signal; and manipulating the flow rate of the first portion of liquid in response to the third signal.

In another aspect of the present invention, a method is provided comprising flashing a first predominantly liquid stream having a first concentration of polymer to form an overhead stream comprising predominantly solvent and a predominantly liquid bottoms second stream having a second concentration of polymer; mixing at least a portion of the second stream with a third predominantly liquid stream having a third concentration of polymer to form the first predominantly liquid stream; establishing a first signal representative of the flow rate of the first stream; and regulating the flow rate of the second stream in response to the first signal.

According to another aspect of the present invention, an apparatus comprises a first vessel; a second vessel; a first conduit means establishing flow communication between the first vessel and the second vessel; a second conduit means connecting the first conduit means and the first vessel; a means cooperating with the first vessel for sensing a liquid level in said vessel and establishing a first signal representative of said liquid level; a means cooperating with the second vessel for sensing a liquid level in said second vessel and establishing a second signal representative of said liquid level; a means for receiving the first signal and the second signal and establishing a third signal representative of a predetermined relationship between the first signal and the second signal; and a means cooperating with the first conduit means for receiving the third signal and manipulating fluid flow through the first conduit means in response to the third signal.

According to yet another aspect of the present invention, an apparatus comprises a pressure vessel; a first conduit means emptying into the pressure vessel; a second conduit means connected to an upper portion of the pressure vessel; a third conduit means connected to a lower portion of the pressure vessel and establishing a flow path between the pressure vessel and the first conduit means, said third conduit means dividing the first conduit means into an upstream portion, and a downstream portion between the third conduit means and the vessel; a means cooperating with the upstream portion of the first conduit means for sensing liquid flow through the upstream portion of the first conduit means and establishing a signal representative of said fluid flow; and a pump cooperating with the third conduit means for receiving the signal representative of fluid flow through the first conduit means and causing fluid flow from the vessel and to the first conduit means in response to said signal.

BRIEF DESCRIPTIONS OF THE DRAWINGS

FIG. 1. FIG. 1A illustrates in schematic a portion of process flow according to the present invention.

FIG. 2. FIG. 1B illustrates in schematic a second portion of the process flow scheme according to the present invention.

DETAILED DESCRIPTION OF THE INVENTION

Figure 1A:
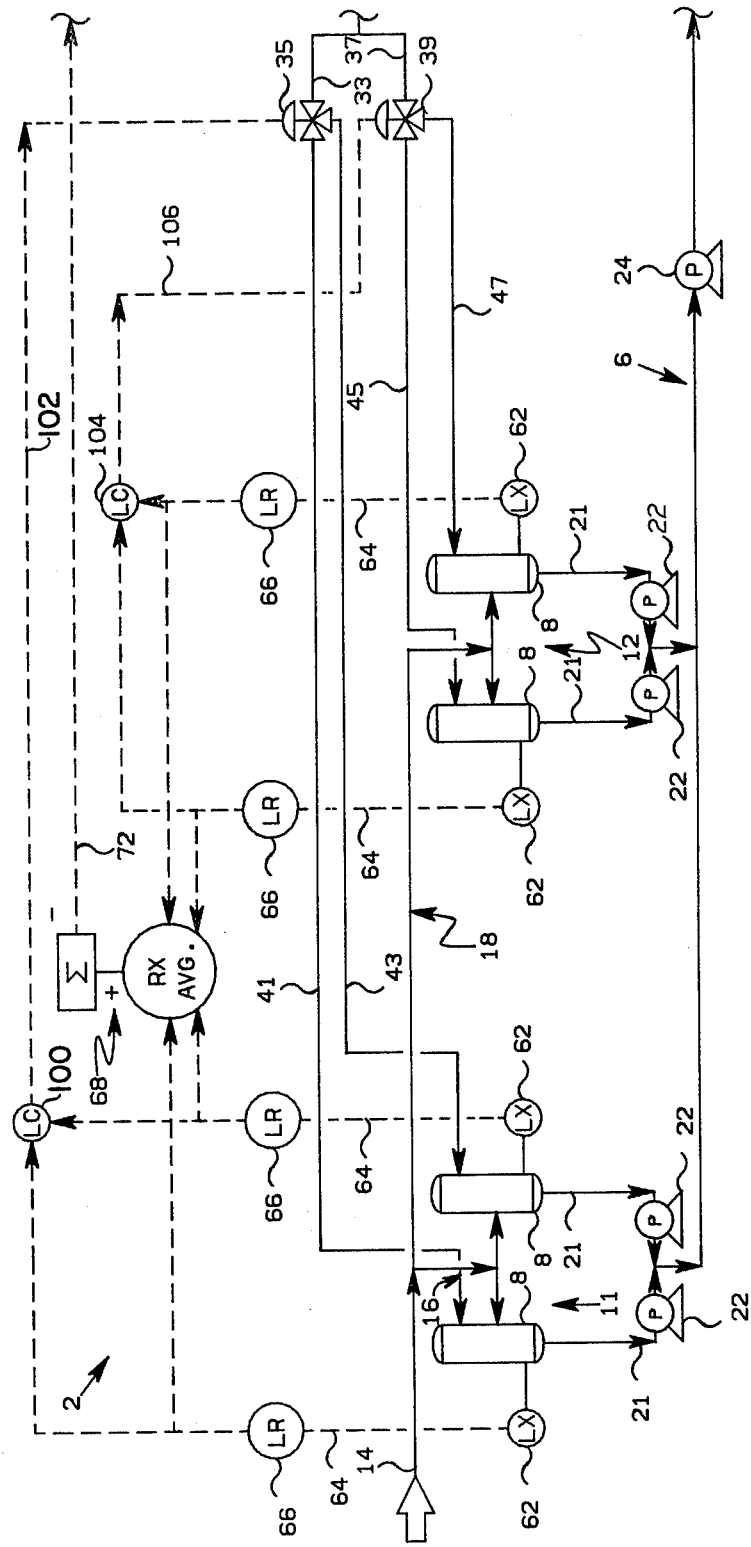

A specific control system configuration is set forth in FIG. 1 for the sake of illustration. However, the invention extends to different type of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electric form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

Both the analog and digital controllers shown may utilize the various modes of control such as proportional, proportional-integral, proportional-derivative, or proportional-integral-derivative. In the preferred embodiment, proportional-integral-derivative controllers are utilized but any controller capable of accepting two input signals and producing a scaled output signal, representative of a comparison of the two input signals, is within the scope of the invention.

The scaling of an output signal by a controller is also well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature, for example.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Generally, according to the invention an apparatus comprises a first zone 2, a second zone 4, the first and second zones being connected by a conduit means 6.

The zone 2 preferably comprises two pairs 11 and 12 of vessels 8, such as tertiary flash tanks 8. The zone 2 receives fresh feed comprising polymer and solvent from a reactor not shown via a conduit means 14 which preferably includes a first fluid distribution means 16 which empties into each of the first pair 11 of tanks 8 and a second fluid distribution means 18 which empties into each of the second pair 12 of tanks 8.

The conduit means 6 preferably includes a collection means connected to each tank 8 such as branch 21 containing a pump 22. Further, pump means, such as pump 24 cooperates with the conduit means 6 and is operable for inducing liquid flow from the zone 2 to the zone 4. Because the liquid carried by the conduit 6 is normally of a high viscosity, pump 24 is normally of the gear type. A suitable pump is supplied by Luwa Corporation, of Charlotte, North Carolina. A conduit means connects the conduit 6 with the zone 2. Preferably, a conduit 32 having a valve 34 therein connects with the conduit 6 between the pump means 24 and the zone 4, as at connection 31. The conduit 32 carries fluid for recycle to the vessels 8. It connects to a conduit 33 which empties into a first 3-way valve 35, and a conduit 37 which connects to a second 3-way valve 39. Preferably diaphragm operated valves, supplied by most any reputable instrument equipment company are used as 3-way valve 35 and 3-way valve 39. Conduits 41 and 43 define a flow path and extend between the 3-way valve 35 and the vessels 8 of the first pair 11. Each conduit 45 and 47 defines a flow path and extends between the 3-way valve 39 and the vessels 8 of the second pair 12.

A connection 28 is associated with the conduit means 6 between the connection 31 and the zone 4. Preferably, connection 28 is an inline mixer with specially designed baffles and ribbons to thoroughly mix two viscous liquids. A suitable inline mixer is supplied by Komax Systems, Inc. The contents of the conduit 6 between the connection 31 and the connection 28 are denoted in the drawing as stream 10. A heater 36 is associated with the conduit 6 between connection 28 and the zone 4. A valve 38, such as a diaphragm motor valve, is disposed in the conduit 6 between the heater 36 and the zone 4. The contents of the conduit 6 between the connection 28 and the heater 36 are denoted on the drawing as stream 30. The contents of the conduit 6 between the heater 36 and the valve 38 are denoted on the drawing as stream 40.

The conduit 6 empties into the zone 4, which preferably comprises a flash concentrator including a high pressure vessel 42, the conduit 6 emptying thereinto via a nozzle, not shown. A conduit 50 is connected to an upper portion of the vessel 42 to withdraw overhead vapors from the vessel 42 and convey same to an overhead accumulator vessel 44, into which the conduit 50 empties for separation of liquids. A conduit 46 having a valve 48 operably associated therewith is connected to an upper portion of the knock-out 44 for withdrawing vapors therefrom. The conduit 46 empties into an overhead accumulator, not shown. A conduit 52 having a pump 54 operably associated therewith is connected to a lower portion of the liquid knock-out 44 for withdrawing liquid therefrom and conveying same to further processing, such as waste stripping, not shown.

The flash concentrator vessel 42 is provided with at least one conduit for withdrawal of bottoms material. Preferably, a conduit 56 is connected to the lower portion of the flash concentrator 42 for withdrawal of and recycle of bottoms, and a conduit 58 is connected to a lower portion of the concentrator 42 for withdrawal of bottoms material and conveying same to further processing.

The conduit 56 establishes a flow path between the lower portion of the concentrator 42 and the connection 28. A pump 62 operably associated with the conduit 56 causes fluid flow from the concentrator 42 to the connection 28. The contents of the conduit 56 between the pump 62 and the mixing valve 28 are designated on the drawing as stream 20.

The conduit 58 establishes a flow path between the lower portion of the concentrator 42 and further processing apparatus such as a secondary flash concentrator and/or a melt devolatilizer, not shown. The purpose of the melt devolatilizer is to extract the final small portion of solvent from the liquid stream and to convert the typically very viscous liquid into a pellet or bead form for ease of handling. The melt devolatilizer maintains the liquid in a fluid state by means of heat and pressure and mechanically extrudes the liquid to produce the pellet. A suitable melt devolatilizer is supplied by Werner and Pfleiderer Corporation of Stuttgart, West Germany. A pump 64 is operably associated with the conduit 58 for inducing fluid flow from the concentrator 42 to the further downstream equipment. A heater 66 is associated with the conduit 58 between the pump 64 and the downstream equipment. The contents of the conduit 58 downstream of the heater 66 are designated as stream 60. A conduit 68 having a valve 72 associated therewith is connected to the conduit 58 between the pump 64 and the heater 66 and empties back into the concentrator 42.

Operation of the apparatus is as follows.

Liquid such as a polymer solution is removed from the zone 2 via conduit 6 due to the action of pumps 22 and 24. The stream is divided at the connection 31, a first portion of the stream is passed to the second zone 4, and a second portion of the stream is passed via conduit line 32 back to the first zone 2. A level element 62 cooperating with each vessel 8, one per vessel, senses the liquid level in its respective vessel and establishes a signal 64 representative of said level which is transmitted to an averaging relay 68. Preferably, each signal 64 is transmitted through a level recorder 66 prior to receipt by the averaging relay 68. A suitable averaging relay with its function to receive an input of more than one signal, to average these signals and to transmit this average value in order to control the required stream or function can be supplied by most any major instrument equipment manufacturing company. The averaging relay 68 establishes a signal 72 representative of the liquid level in the first zone 2. This system tends to maintain the same level in each vessel 8.

A level element 74 associated with the vessel 42 of the second zone 4 senses the liquid level in the second zone and establishes a signal 76 representative of said level.

The signals 72 and 76 are received by a comparison means such as level recorder controller 78 which compares the signal 72 to the signal 76 and establishes a third signal 80 representative of a predetermined relationship between the signal 72 and the signal 76. Preferably, the signal 80 is a scaled difference between the signals 72 and 76 so as to represent the required flow rate through the conduit 6 to maintain the desired relationship between the signals 72 and 76. The purpose of this particular control loop is to maintain a constant level in each vessel 8 as well as vessel 42. The rate at which the first portion of the liquid stream is pumped to the second zone 4 is manipulated in response to the signal 80.

Preferably, one or the other of the signals 72 and 76 is the set point for the level recorder controller 78.

In the illustrated embodiment, the signal 80 is received by a flow recorder controller 82, which also receives a signal 84 from a flow element 86 associated with the conduit 6 downstream of the connection 28, the signal 84 being representative of the rate of flow of fluid entering the zone 4. The controller 82 establishes a signal 88 representative of a predetermined relationship between the signals 80 and 84 such as a difference, which, after passing through a relay 90 is used to manipulate the valve 38. Valve 38 is preferably a diaphragm operated control valve that is used to maintain a constant level in vessel 42.

As valve 38 is manipulated, the fluid in the conduit 6 undergoes a pressure change. A pressure element 92 is associated with the conduit 6 between the connection 28 and the vessel 42 for sensing the pressure of the portion of the liquid being conveyed to the zone 4 and establishing a signal 94 representative of said pressure. The rate of liquid recycle to the zone 2 is manipulated in response to the signal 94 representative of the pressure in the conduit 6. Preferably, the signal 94 is received by a comparison means, such as a pressure recorder controller 96 which establishes a signal 98 representative of a predetermined relationship, such as a difference, between the signal 94 and a set point signal representative of a desired pressure in the conduit 6. Preferably, the signal 98 is scaled so as to represent a required change in flow through the conduit 32 so as to maintain the desired relationship between the set point and the signal 94. Pressure in conduit 6 must be maintained at a constant value in order for flow element 86, for flow element 138 and for connection 28 to function properly. The signal 98 is received by the valve 34 which is manipulated in response thereto, thereby controlling the pressure in the conduit 6.

The level in the primary flash concentrator 42 is controlled from two directions. With less roll back to the tertiary flash tanks, their levels will begin to drop. The average level signal 72 sent from the tertiary flash tanks 8 will drop. Reduced roll back to the tertiary flash tanks 8 also causes the level in the primary flash concentrator to rise. The indicated level signal 76 will also rise. Thus, the set point level will come down and the indicated level will rise. As the two levels approach each other, the control actions will become smaller and smaller, until a steady level is reached.

A similar process occurs if comparison by controller 78 shows that the indicated level 76 in the primary flash concentrator 42 is above the set point signal 72. The signal 80 sent to the controller 82 triggers the closing of valve 38 slowing flow into the primary flash concentrator 42. As the valve 38 closes, pressure in the line 6 increases. The pressure transmitter 92 relays the increased pressure to the controller 96 which opens the valve 34 on the roll line 32 to the tertiary flash tanks 8 to relieve the pressure in the line 6. With the increased roll to the tertiary flash tanks 8, their levels will begin to rise. Higher level signals 64 are sent to the averaging relay 68, which sends a higher set point signal 72 to the controller 78. With less flow in, the indicated level signal 76 and the set point signal 72 approach each other, and control action decreases until a steady level is reached.

Roll back to the zone 2 is distributed among the vessels 8 by 3-way valves 35 and 39, which regulate flow as between the vessels 8 of a pair 11 or 12. Valves can obviously be provided if desired to regulate the flow as between the pairs 11 or 12. A level controller 100 receives the signals 64 from the first pair 11 of vessels 8 and establishes a signal 102 representative of a predetermined relationship such as a difference between the individual signals from each vessel which is transmitted to the valve 35. Valve 35 is a 3-way type valve that is capable of receiving liquid from conduit 33 and disbursing this same liquid to vessel 8 of pair 11 in a manner to maintain a constant level in each vessel 8 in pair 11. The valve 35 is manipulated in response to the signal 102 to increase the amount of flow to the vessel of the pair 11 having the lower liquid level. Similarly, signals 64 from the vessels 8 of the second pair 12 are received by a level controller 104 which establishes a signal 106 representative of a predetermined relationship between the individual signals which is transmitted to the valve 39. The valve 39 is manipulated in response to the signal 106 to increase the amount of flow to the vessel of the pair 12 having the lower liquid level.

The flow of working fluid through the heater 36 is manipulated to control the temperature of the fluid entering the zone 4. Preferably, a temperature element 108 associated with the conduit 6 between the heater 36 and the vessel 42 establishes a signal 110 representative of the fluid temperature in the conduit 6 which is received by a comparison means such as a temperature recorder controller 112. The temperature recorder controller 112 compares the signal 110 with a set point signal representative of a desired fluid temperature and establishes a signal 114 which is representative of a predetermined relationship between the set point signal and the signal 110. The signal 114, which is preferably scaled so as to represent the required flow rate through the heater 36 in order to maintain the desired relationship between the two signals, is received by a valve 116 positioned so as to regulate the flow of working fluid, such as steam, through the heater 36. The valve 116 is manipulated in response to the signal 114, thereby controlling the temperature of fluid entering the vessel 42. Functionally, the set point of temperature recorder controller 112 is predetermined and set at a certain value. When the response to temperature element 108 indicates that the temperature of the liquid in conduit 6 between heater 36 and vessel 42 is decreasing, for example, temperature element 108 sends the signal to temperature recorder controller 112. Since the temperature is below the predetermined value of the set point, signal 114 is transmitted to control valve 116, control valve 116 opens to admit more steam to heater 36 in order to raise the temperature of the liquid in conduit 6 up to the set point value.

The flow rate of fluid overhead from the zone 4 is controlled in response to the pressure in the zone 4. A pressure element 118 associated with the vessel 42 establishes a signal 120 representative of the pressure in the vessel 42 which is transmitted to a comparison means, such as a pressure recorder controller 122. The pressure recorder controller 122 establishes a signal 124 which is representative of a predetermined relationship such as a difference between the signal 120 and a set point signal representative of a desired value for the pressure in the vessel 42. The signal 124 is transmitted, preferably via a relay 126 to the valve 48, which is manipulated in response to the signal 124. The pressure to be maintained and controlled in vessel 42 is predetermined by process calculations and the set point on pressure recorder controller 122 is set at this pressure value. When the pressure in vessel 42 decreases from the set point value, for example, this lower pressure value is transmitted by pressure element 118 and by signal 120 to pressure recorder controller 122. Since the pressure from signal 120 is lower than the set point, this lower value is sent to relay 126 by signal 124, which in turn closes valve 48 in order to increase the pressure in vessel 42 up to the set point value. If the pressure in vessel 42 is higher than the set point on pressure recorder controller 122, the process is reversed to open valve 48.

The pressure of stream 60 is controlled by manipulation of the valve 72 in the roll line 68 back to the flash concentrator 42. A pressure element 128 senses the pressure of the stream 60 and establishes a signal 130 which is representative of said pressure. The signal 130 is received by a comparison means, such as a pressure recorder controller 132, which establishes a signal 134 representative of a predetermined relationship, such as a difference between the signal 130 and a set point signal which is representative of a desired value of the pressure of the stream 60. The valve 72 receives the signal 134 which is preferably scaled to represent the flow rate through conduit 68 which is required to maintain the desired value between the set point and signal 130, and is manipulated in response thereto, thereby controlling the pressure of the stream 60. The set point value at pressure recorder controller 132 is predetermined by process calculations. If the pressure in stream 60 is lower than the set point value, for example, a signal is transmitted by pressure element 128 and signal 130 to pressure recorder controller 132. Pressure recorder controller 132 in turn transmits a signal to valve 72 by signal 134 and calls for valve 72 to close. Valve 72 will close enough to cause the pressure in stream 60 to increase to its set point value. When the pressure in stream 60 increases to a value above the set point value, the control loop works in reverse to open valve 72 in order to reduce the pressure in stream 60 to the set point of pressure recorder controller 132.

The flow rate through the conduit 56 is controlled in response to the flow rate through the conduit 6 upstream of the connection 28. Preferably, the flow rate of stream 20 is a constant multiple of the flow rate of the stream 10.

The predominantly liquid stream carried by conduit 6 downstream of the connection 28 having a first concentration of polymer is preferably flashed in the vessel 42 to form the overhead stream 50 and the bottoms stream 20 having a second concentration of polymer. The bottoms stream 20 is conveyed to the connection 28 and mixed with the predominantly liquid stream 10 carried by the conduit 6 immediately upstream of the connection 20 and having a third concentration of polymer. Assuming the concentrations of polymer at stream 10 and stream 20 are stable, the concentration of polymer in stream 40 being fed to the vessel 42 can be maintained relatively constant by blending streams 10 and 20 at the connection 28 at a preselected ratio.

In accordance with this aspect of the invention, a flow element 138 is associated with the conduit 6 between the stream 32 and the connection 28. The flow element 138 establishes a signal 140 representative of the flow rate through the conduit 6 at stream 10. The signal 140 is received by a means for establishing a signal 142 having a predetermined relationship with the signal 140, such as a flow ratio recorder controller 144. Preferably, the recorder controller 144 receives the signal 140 and multiplies it by a set point signal to produce the signal 142. The set point signal can be selected from a wide range of values. Preferably, however, a set point signal having a value within the range of from about 0.10 to about 1.0, more preferably, within the range of from about 0.15 to about 0.75 is utilized.

The signal 142 is received by a suitable comparison means, such as a flow recorder controller 146, which establishes a signal 148 representative of a predetermined relationship, such as a difference between the signal 142 and a signal 150. Preferably, the signal 148 is suitably scaled to represent a desired speed of a motor 160 to maintain a desired relationship between the signals 142 and 150. The ratio of the total flow of stream 10 and of the total flow of stream 20 is maintained at a constant value as determined by process calculations. Normally the total flow of stream 10 will remain constant, however if stream 10 does vary, the flow of stream 20 will change in order to maintain a constant ratio between stream 10 and stream 20. In practice, the set point of flow ratio recorder controller 144 is predetermined. If the flow of stream 10 increases, this signal is transmitted by flow element 138 and signal 140 to flow ratio recorder controller 144. The output signal 142 is sent from flow ratio recorder controller 144 to flow recorder controller 146. Since signal 142 becomes higher than the flow set point on flow recorder controller 146, signal 148 is transmitted to speed controller 154, which in turn transmits signal 156 to motor 160. Since motor 160 is of the variable speed type, the signal 156 calls for the motor 160 to increase in speed, which in turn will increase the flow of liquid through pump 62 to the point where the ratio of stream 10 and stream 20 is of the proper value. When the flow of stream 10 decreases, the control loop will reverse the procedure to reduce the speed of pump 62 to maintain a constant ratio between stream 10 and stream 20. The signal 150 is representative of the rate of flow through the conduit 56, and is established, for example by a speed element 152 coupled to pump 62, for example, where pump 62 is of the positive displacement type.

The signal 148 is received by a speed controller 154 which produces a suitable signal 156 which is relayed to a motor 160 coupled to the pump 62, thereby controlling the speed of the pump 62 and thus the flow rate of stream 20, in response to the flow rate on the stream 10.

The invention is further illustrated by the following Table, showing calculated balances for a preferred embodiment, with reference to FIG. 2.

TABLE I

| STREAM | 10 | 20 | 30 | 40 | 50 | 60 |
|---|---|---|---|---|---|---|
| Component[1] | | | | | | |
| Ethylene | 8856 | 1080 | 9936 | 9936 | 5285 | 3571 |
| Polymer | 360,000 | 109,968 | 469,968 | 469,968 | | 360,000 |
| Solvent[2] | 2,211,408 | 380,280 | 2,480,640 | 2,480,640 | 1,318,560 | 892,848 |
| Wt. % Polyer | 13.95 | 28.92 | 15.87 | 15.87 | | 28.65 |
| Temperature[3] | 266 | 285 | 268 | 390 | 285 | 390 |
| Pressure[4] | 370 | 370 | 340 | 300 | 44 | 300 |

[1] Pounds Per Day
[2] (wt %) 66% cyclohexane, 23% N—hexane, 11% dimethylpentane
[3] °F.
[4] Pounds Per Square Inch, guage

What is claimed is:
1. A method comprising
  (a) flashing a predominantly liquid stream having a first concentration of polymer in a flash zone to form an overhead stream comprising predominantly solvent;
  (b) pumping a predominantly liquid bottoms second stream having a second concentration of polymer from the flash zone;
  (c) mixing the second stream with a third predominantly liquid stream having a third concentration of polymer to form the first predominantly liquid stream;
  (d) establishing a first signal representative of the flow rate of the third stream; and
  (e) regulating the flow rate of the second stream in response to said first signal.

2. A method as in claim 1 wherein the pumping of the second stream from the flash zone is controlled in response to the first signal.

3. A process as in claim 2 further comprising receiving the first signal by a suitable means and establishing a second signal in response to the first signal, said second signal leaving a predetermined relationship with respect to the first signal and being representative of a desired rate at which the second stream is to be mixed with the third stream.

4. A process as in claim 3 wherein the second signal is representative of a flow rate between about 0.1 and 1.0 of the flow rate of the third stream.

5. A process as in claim 4 wherein the second signal is representative of a flow rate between about 0.15 and about 0.75 of the flow rate of the first stream.

6. A process as in claim 4 wherein the first stream comprises within the range of from about 12 to about 20 weight percent polyethylene in solvent, wherein the second stream comprises within the range of from about 20 to about 40 weight percent polyethylene in solvent, and wherein the third stream comprises from about 10 to about 18 weight percent polyethylene in solvent, the percentages based total weight of polyethylene and solvent.

* * * * *